Patented Oct. 10, 1922.

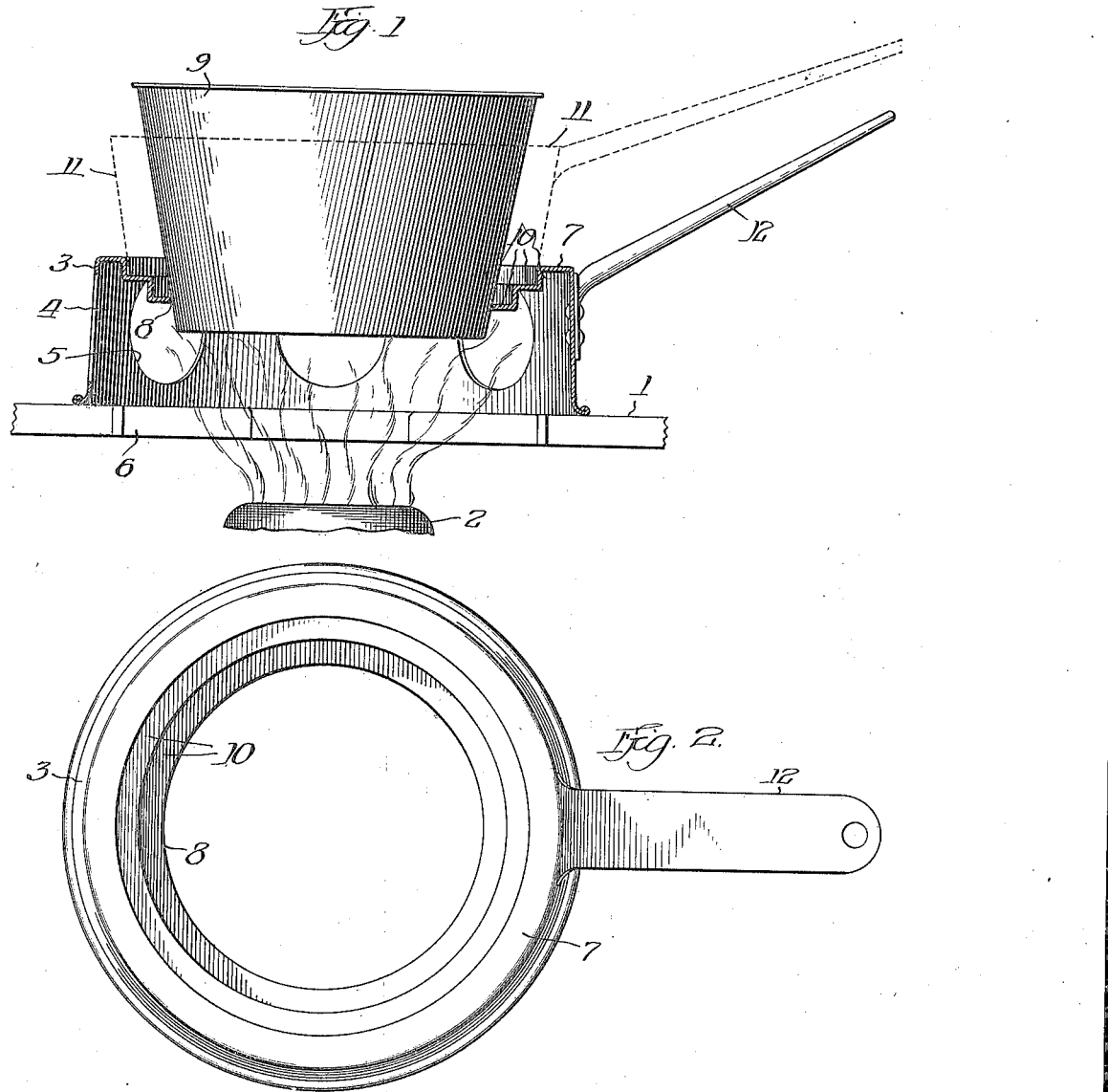

1,431,696

UNITED STATES PATENT OFFICE.

ALICE L. SHANKLAND, OF CHICAGO, ILLINOIS.

COOKING UTENSIL.

Application filed June 26, 1920. Serial No. 391,892.

*To all whom it may concern:*

Be it known that I, ALICE L. SHANKLAND, a citizen of the United States, residing at Chicago, in the county of Cook and State of Illinois, have invented a certain new and useful Improvement in Cooking Utensils, of which the following is a full, clear, concise, and exact description, reference being had to the accompanying drawings, forming a part of this specification.

My invention relates to cooking utensils or like devices.

The object of the invention is to provide a device by which scorching may be prevented when articles are being cooked on a stove or otherwise.

In the accompanying drawings Fig. 1 is a side elevation of a device embodying my present invention, also showing part of a cook stove and a pan containing food which is being cooked.

Fig. 2 is a plan view of the same.

Referring to the drawings I show part of a gas stove 1, the part shown being the floor or top on which pans or like articles are usually placed when they are to be heated by the gas burner. I also show a burner 2 which is understood to be a gas burner forming part of the gas stove and located below the floor or top 1.

I also show a device 3 embodying my present invention and adapted to rest upon the floor or top 1 above the burner 2, and also adapted to serve as an elevated seat for a pan or kettle or similar device in which cooking is to be done. The device 3 is formed with a wall 4 preferably annular in shape and preferably provided with openings 5 to permit the outward passage of the flames and heated gases. The wall 4 is adapted to rest upon the top 1 and is preferably of such size that it straddles or extends across the opening 6 which is formed in the wall 1 for the burner 2. Said device 3 also has a top 7 having an aperture or opening 8 in which a cooking utensil such as a pan 9 may be placed. Said top 7 is also preferably provided with surfaces 10—10 of different heights and different diameters so as to accommodate pans or kettles of different sizes. For instance a pan 11 is shown in dotted lines as resting upon the upper surface 10. The device 3 is also preferably provided with a handle 12 by which it may be placed in position on the stove and removed from the same.

Thus it will be seen that the device may be first put in position on the stove, and then a pan or kettle such as 9 or 11 may be placed in position either in the aperture 8 of said device 3 or on one of the different surfaces of the same, and such pan 9 or 11 or other cooking utensil will be elevated above the flame 2 so that it may be properly heated, but will not be heated to such an extent as to scorch the contents. This eliminates a source of annoyance and trouble and also makes it possible for the person doing the cooking to leave the stove to do other work without likelihood of bad results following.

It will be seen of course that the stove can be used without the device 3 if desired, and in some cases this is desired in order to secure a more intense heat.

It will be understood that changes and modifications may be made without departing from the spirit of the invention.

What I claim is:

1. In a support for cooking utensils, a hollow body of sheet metal having an annular vertical wall provided with a plurality of perforations and a marginal reinforcing bead, a top wall integral with said vertical wall and provided with an axial opening, and a plurality of annular shoulders formed in the top wall near the margin of the opening, and said shoulders being arranged at different heights in the order of their respective diameters.

2. In a support for cooking utensils, in combination, a body composed of a single sheet of metal formed to provide an annular side wall and top wall, the top wall having an axial opening, a plurality of openings in said side wall, said top wall being provided with a plurality of stepped annular shoulders bordering the opening in said top wall, and said shoulders arranged at different heights in the order of their respective sizes from the opening in said top wall toward said side wall for supporting utensils of various sizes over said opening.

In witness whereof I hereunto subscribe my name this 29th day of May, A. D. 1920.

ALICE L. SHANKLAND.